United States Patent
Mese

(10) Patent No.: US 9,521,531 B2
(45) Date of Patent: Dec. 13, 2016

(54) AUDIO-VISUAL DATA TRANSMISSION OVER INTERNET PROTOCOL AT HIGHER RATES

(71) Applicant: Broadcom Corporation, Irvine, CA (US)

(72) Inventor: Murat Mese, Rancho Palos Verdes, CA (US)

(73) Assignee: BROADCOM CORPORATION, Irvine, CA (US)

( * ) Notice: Subject to any disclaimer, the term of this patent is extended or adjusted under 35 U.S.C. 154(b) by 188 days.

(21) Appl. No.: 13/657,560

(22) Filed: Oct. 22, 2012

(65) Prior Publication Data

US 2013/0136001 A1     May 30, 2013

Related U.S. Application Data

(60) Provisional application No. 61/565,439, filed on Nov. 30, 2011.

(51) Int. Cl.
| | |
|---|---|
| *H04W 4/18* | (2009.01) |
| *H04W 56/00* | (2009.01) |
| *H04W 88/06* | (2009.01) |
| *H04W 36/14* | (2009.01) |
| *H04L 12/815* | (2013.01) |

(52) U.S. Cl.
CPC ............ *H04W 4/18* (2013.01); *H04W 56/001* (2013.01); *H04L 47/22* (2013.01); *H04W 36/14* (2013.01); *H04W 88/06* (2013.01)

(58) Field of Classification Search
CPC .................................................. H04W 84/12
USPC ......................................................... 370/235
See application file for complete search history.

(56) References Cited

U.S. PATENT DOCUMENTS

| | | | | |
|---|---|---|---|---|
| 5,467,342 | A  * | 11/1995 | Logston | ................ H04J 3/0632 370/253 |
| 2004/0170199 | A1* | 9/2004 | Golan | ..................... H04L 29/06 370/516 |
| 2007/0116117 | A1* | 5/2007 | Tong et al. | ............... 375/240.08 |
| 2009/0119411 | A1* | 5/2009 | Rutherford et al. | .......... 709/233 |
| 2009/0252097 | A1* | 10/2009 | Iyer et al. | ...................... 370/329 |
| 2011/0053521 | A1* | 3/2011 | Cordeiro | ......................... 455/73 |
| 2011/0065440 | A1 | 3/2011 | Kakani | |
| 2011/0070842 | A1 | 3/2011 | Kwon et al. | |
| 2012/0014335 | A1* | 1/2012 | Adachi et al. | ................ 370/329 |
| 2012/0133827 | A1* | 5/2012 | Hsu | ..................... H04L 65/4092 348/441 |
| 2012/0135724 | A1* | 5/2012 | Lewis | ................... H04W 92/20 455/422.1 |
| 2013/0142059 | A1* | 6/2013 | Di Girolamo et al. | ....... 370/252 |

OTHER PUBLICATIONS

ECMA-387 Standard, $2^{nd}$ Edtion, Dec. 2010.*
Kakani; NT-May-Nokia; IEEE-SA Mentor; May 18, 2010; pp. 1-15; vol. 802.11ad, No. 2.
European Patent Office; EP Search Report; EP Application No. 12007628.6; Mar. 15, 2015; 3 pgs.

* cited by examiner

*Primary Examiner* — Yaotang Wang
(74) *Attorney, Agent, or Firm* — Garlick & Markison; Bruce E. Garlick

(57) ABSTRACT

A technique to switch high data rate content from higher frequency band transmission to lower frequency band transmission that uses Internet Protocol, without adding appreciable latency or jitter that may be manifested on a display.

20 Claims, 6 Drawing Sheets

AUDIO-VISUAL DATA TRANSMISSION OVER INTERNET PROTOCOL AT HIGHER RATES

CROSS REFERENCE TO RELATED APPLICATION

This application claims the benefit of priority under 35 U.S.C. 119(e) to U.S. Provisional Patent Application No. 61/565,439, filed Nov. 30, 2011, which is incorporated herein by reference in its entirety for all purposes.

BACKGROUND OF THE INVENTION

Technical Field of the Invention

The embodiments of the invention relate to wireless communications and, more particularly, to a transfer of higher data rate audio and video signals over Internet Protocol.

Description of Related Art

Various wireless communication systems are known today to provide communication links between devices, whether directly or through a network. Such communication systems range from national and/or international cellular telephone systems, the Internet, point-to-point in-home systems, as well as other systems. Communication systems typically operate in accordance with one or more communication standards or protocols. For instance, wireless communication systems may operate using protocols, such as IEEE 802.11, Bluetooth™, advanced mobile phone services (AMPS), digital AMPS, global system for mobile communications (GSM), code division multiple access (CDMA), local multi-point distribution systems (LMDS), multi-channel-multi-point distribution systems (MMDS), as well as others.

For each wireless communication device to participate in wireless communications, it generally includes a built-in radio transceiver (e.g. receiver and transmitter) or is coupled to an associated radio transceiver (e.g. a station for in-home and/or in-building wireless communication networks, modem, etc.). Typically, the transceiver includes a baseband processing stage and a radio frequency (RF) stage. The baseband processing provides the conversion from data to baseband signals for transmitting and baseband signals to data for receiving, in accordance with a particular wireless communication protocol. The baseband processing stage is coupled to a RF stage (transmitter section and receiver section) that provides the conversion between the baseband signals and RF signals. The RF stage may be a direct conversion transceiver that converts directly between baseband and RF or may include one or more intermediate frequency stage(s).

Furthermore, wireless devices typically operate within certain radio frequency ranges or bands established by one or more communication standards or protocols. The 2.4 GHz Band (as well as the 5 GHz Band) that encompasses current WiFi and Bluetooth™ protocols has limited data throughput. More recently, higher frequencies in the millimeter wave range are being utilized, such as one of the newer 60 GHz standards, to pursue much higher throughput. Using 60 GHz Band technology, high data rate transfers, such as real-time uncompressed/compressed high-definition (HD) audio and video streams, may be transferred wirelessly between two devices. Due to this inherent real-time requirement for the targeting applications, 60 GHz standard explicitly defines a Quality of Service (QoS) requirement for traffic streams to meet high throughput among devices.

The 60 GHz Band may also be referred to as directional or D-Band and utilizes directional communications, instead of omni-directional (O-Band) propagation of signals (such as at 2.4 GHz and 5 GHz Bands) to overcome the severe path loss experienced at these higher frequencies. The 60 GHz Band devices utilize directional antennas in order to direct the transmitted spectrum energy. One of the protocols/standards being developed utilizing the 60 GHz Band is the IEEE 802.11ad standard. These developing standards call forth certain requirements for devices that are to be compliant to the protocols/standards. One enabling technology for directional signal propagation is beamforming, in which 60 GHz Band devices radiate the propagation energy from a directional antenna or an antenna array and for a receiving antenna or array to orient toward the transmitting device. Another feature is the use of service period scheduling between devices communicating in the 60 GHz Band, instead of the contention-based acquiring as currently used at 2.4/5 GHz.

In one development area for 60 GHz, the Wi-Fi Alliance (WFA) is developing interoperability certification requirements for 60 GHz devices to communicate and transfer high definition video between an audio/video (AV) sourcing device and an AV rendering (sinking) device at close range. A sub-category is the development of wireless transmission of AV content to displays.

As display screen size becomes bigger and resolution (e.g. 1080p) denser, the 60 GHz Band provides one solution to wirelessly transmit AV content data from a content source to a display, because more data may be sent at the higher frequency as compared to 2.4/5 GHz transmissions. Accordingly, A WiFi Display Extension (WDE) is being developed to define and allow for wireless display connections to ensure interoperability and targeted performance.

Although 60 GHz transmissions allow for higher data rate transfer than the currently practiced 2.4/5 GHz WiFi wireless transmissions, one shortcoming is the short range and line-of-sight transmission properties at 60 GHz. Thus, a user watching a program or movie content (such as High-Definition (HD) programming) on a HD display, in which the content is being streamed over the air using the 60 GHz Band, may experience interruptions if the content source is blocked from the display or the content source moves out of range of the display. Note that the content source and/or the display may be a handheld device held by the user. In such an event, it would be advantageous to transfer and couple the video stream over another link, such as the legacy WiFi link that operates at 2.4/5 GHz to maintain the communication.

However, higher frequency data transmissions (e.g. 60 GHz data transmissions), as well as protocols and/or standards that are used for such higher frequency data transmissions (e.g. 60 GHz WDE protocols), being developed are currently not fully compatible with video over lower frequency data transmissions (e.g. 2.4/5 GHz using WiFi protocols). A mechanism is needed to allow for seamless transfer from communication at a higher frequency (e.g. 60 GHz) to communication at a lower frequency (e.g. 2.4/5 GHz) and vice versa. Accordingly, there is a need to find a solution to provide for seamless transition of data transmission from one frequency to a second frequency, where the one frequency is higher than the second frequency, with minimal interruption or minimal degradation of AV content that is being rendered on the display.

DETAILED DESCRIPTION OF THE INVENTION

Figure 1:
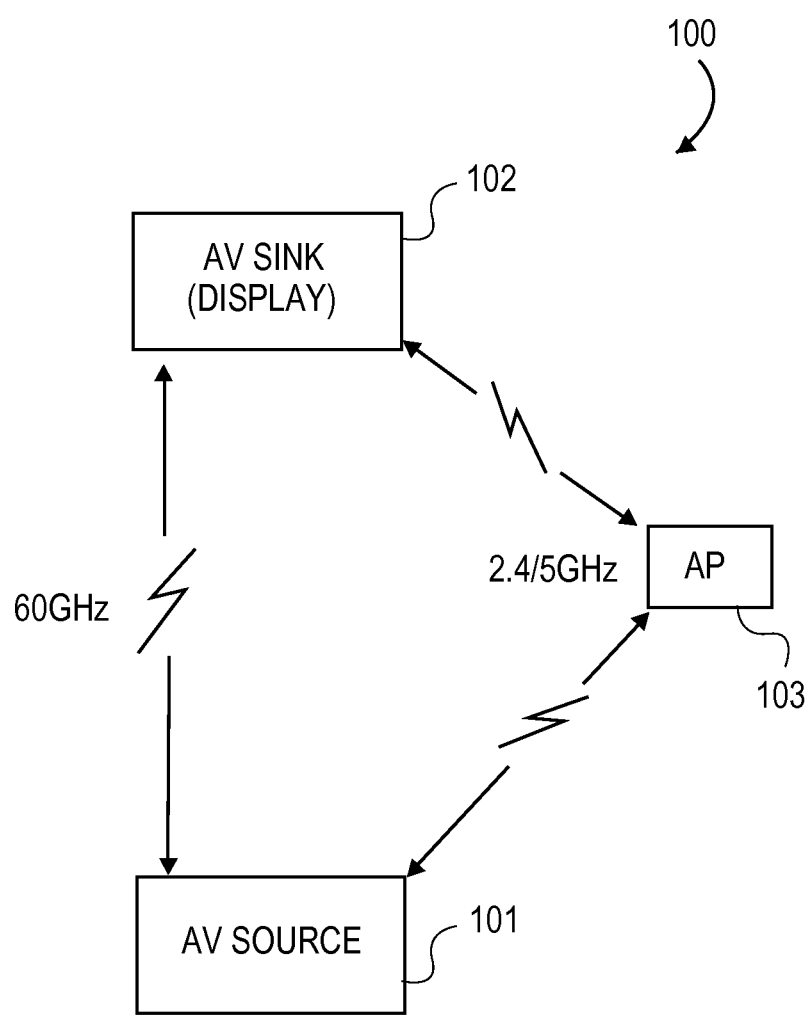
FIG. 1 shows an audio-visual (AV) content source linked to an AV content sink through a first communication link using a first communication protocol and a second communication link, via an access point, using a second communication protocol, in which the first communication link operates at a higher frequency than the second communication link, according to one embodiment of the invention.

The embodiments of the present invention may be practiced in a variety of communication devices that operate in a wireless, wired, or combination of wireless and wired environment or network. The examples described herein pertain to devices that operate at two different radio frequencies, wherein one frequency is higher than the other. Generally, data communication at the first frequency utilizes one communication protocol (or standard), while data communication at the second frequency utilizes a second communication protocol (or standard), which is different from the first communication protocol. The examples described below reference specific frequencies or range of frequencies. For example, the lower frequency range is described in reference to 2.4/5 GHz (commonly referred to as WiFi) and the higher frequency range is described in reference to the 60 GHz Band. That is, the specifically described embodiments below operate approximately at the 2.4 GHz-5 GHz Band and at the 60 GHz Band. However, the invention is not limited to these examples.

Accordingly, the embodiments of the invention pertain to data transmission at two different range of communication frequencies, where one communication frequency is higher than the other. As an example, in one embodiment, the lower frequency is in the range of 2.4/5 GHz and the higher frequency is above 2.4/5 GHz range. In another embodiment, the lower frequency transmission is in the range of 2.4/5 GHz and the higher frequency transmission is in a band above 45 GHz (e.g. 60 GHz) that uses directional antennas. Note that at 60 GHz, the frequency wavelength is in millimeters and, hence, identified as millimeter-wave band. Thus, the second frequency may be operable in any millimeter-wave band. Therefore, the invention need not be limited to the 60 GHz Band for the higher frequency operation. Likewise, the invention need not be limited to the legacy WiFi of 2.4 GHz and 5 GHz for the lower frequency operation.

Furthermore, the examples described herein reference specific standards, protocols, specifications etc., such as the application of the invention based on WGA specifications and/or IEEE 802.11 specifications. However, the invention is not limited to the particular designations noted herein. In addition, the content (data) transfer is described in reference to transmitting audio and/or video (AV) content wirelessly from a content source to a content sink, such as a display. However, the content sink need not be a display in all instances and other rendering devices (other than a display) may receive the AV content. Furthermore, the content need not be limited to the transmission of audio, video and/or multimedia content. The invention is applicable to various other data formats as well.

As noted in the Background section above, the 60 GHz Band (sometimes referred to as D-Band) utilizes directional communications to overcome the severe path loss experienced at the millimeter wave frequencies. The 60 GHz Band as specified by the WGA (or WiGig), specifies that 60 GHz Band devices utilize directional antennas in order to direct the transmitted spectrum energy. A protocol/standard being developed utilizing the 60 GHz Band is the IEEE 802.11ad standard. These developing standards call forth certain requirements for devices that are to be compliant to the 60 GHz Band transmissions. Another standard that is currently in use is the WiFi protocol/standard using omni-directional (or non-directional) transmissions, such as at 2.4 GHz and 5 GHz. Examples of current 2.4/5 GHz Band transmissions include IEEE 802.11 a/b/g/n protocols/standards.

FIG. 1 illustrates a system 100, in which an AV content source 101 is wirelessly linked to an AV content sink 102, such as a display. AV content source 101 and sink 102 are wirelessly linked utilizing one transmission at a higher frequency (or higher frequency band) and a second link utilizing a lower frequency (or lower frequency band). Both AV content source 101 and sink 102 have circuitry capable of providing the two wireless communications. The circuitry is further described in reference to FIG. 3. The specific example embodiment shown in FIG. 1 utilizes the 60 GHz Band (hereafter simply noted as 60 GHz) for the higher frequency communication and 2.4/5 GHz Band (hereafter simply noted as 2.4/5 GHz) for the lower frequency communication. Again, the embodiments of the invention are not limited to theses frequency ranges.

As noted above, the 60 GHz link may utilize the protocols established by WGA for 60 GHz communication. The 60 GHz link for system 100 is a direct link between content source 101 and sink 102. The 60 GHz communication link may be established indirectly between content source 101 and sink 102, as shown for an equivalent system 110 in FIG. 2. The indirect 60 GHz link may be established via a Personal Control Point (PCP) 104 (shown in FIG. 2). A PCP may operate equivalently to an Access Point (AP) in setting a control point for a 60 GHz network that links the devices operating within the 60 GHz network. In one embodiment, the 60 GHz wireless link operates according to specifications set by WFA and utilizing WDE to render the content sent from the source to the display.

AV content source 101 may be a stationary device or it may be a mobile device. Fixed content sources include, but are not limited to, computers, servers, DVD/DVR players, set top boxes (STBs), routers, etc. Mobile content sources include, but are not limited to, portable computers, tablet computers, handheld computing devices, mobile phones (such as smartphones), handheld media players, cameras, camcorders, projectors, etc.

AV content sink 102 is generally a display for rendering AV content, such as a display monitor, television set, etc., to render video, audio or combined video and audio (e.g. multimedia). AV sink 102 need not be limited to displays, but the display is used in the described embodiment, since the WDE application generally applies to rendering AV content on a display. AV sink 102 may be a stationary device, such as a large television display, or a mobile device, such as a mobile phone or other handheld device. Furthermore, it is noted that the examples are described in reference to wireless communication, but other embodiments may use wired connections or a combination of wireless and wired linkage. Thus, in one embodiment, the 2.4/5 GHz communication link shown may utilize a wired connection, such as a LAN (Local Access Network).

Provided AV content source 101 and AV sink 102 are within communicating distance from each other for 60 GHz communication, or within range of the PCP to establish an indirect path through a network, the content source transmits the content to the content sink utilizing a specified protocol/standard. In one embodiment, the 60 GHz communication protocol set by the WGA is utilized.

Figure 2:
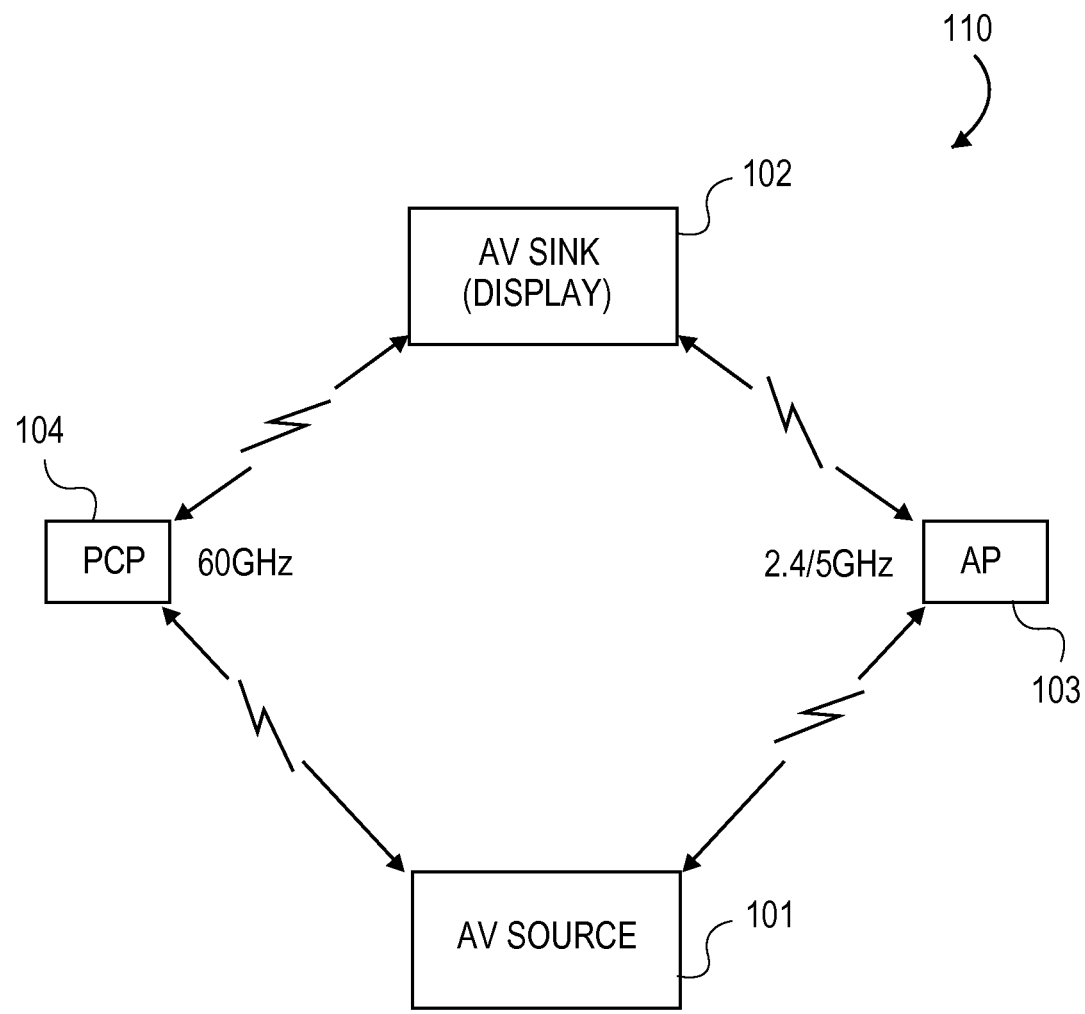
FIG. 2 shows an equivalent linkage as FIG. 1, with the exception that the higher frequency link between the content source and the content sink is obtained indirectly through a control point, according to one embodiment of the invention.

FIGS. 1 and 2 also show the second communication link between AV content source 101 and sink 102, utilizing a different protocol/standard. In the example, the second link utilizes either the 2.4/5 GHz link, commonly referred to as WiFi. As noted in FIGS. 1 and 2, an Access Point (AP) 103 is utilized for the 2.4/5 GHz network to provide a control or access point. Furthermore, it is noted that the examples are described in reference to wireless communication, but other embodiments may use wired connections or a combination of wireless and wired linkage.

Accordingly, two communication paths exist between AV content source 101 and sink 102, in which one is a higher frequency path utilizing directional antennas, while the second path is a lower frequency path utilizing non-directional antennas. As noted above, in one embodiment, the higher frequency path operates at the millimeter wave range (such as the 60 GHz Band) while the lower frequency path operates approximately at 2.4/5 GHz (such as the legacy WiFi).

Although various communication standards/protocols may be utilized to communicate between AV content source 101 and sink 102, in one embodiment, IEEE 802.11 protocol is selected. Thus, in one embodiment, the WiFi link may utilize a protocol based on at least one of IEEE 802.11a, IEEE 802.11b, IEEE 802.11g and IEEE 802.11n at 2.4/5 GHz. The protocol for the 60 GHz link is provided by IEEE 802.11ad or subsequent versions thereof. As described below for one embodiment, both AV content source 101 and AV content sink 102 contain circuitry (or is coupled to such circuitry, if not integrated therein) to provide processing and radio front end for radio frequency (RF) transmission and/or reception of RF signals at both 60 GHz and at 2.4/5 GHz.

Figure 3:
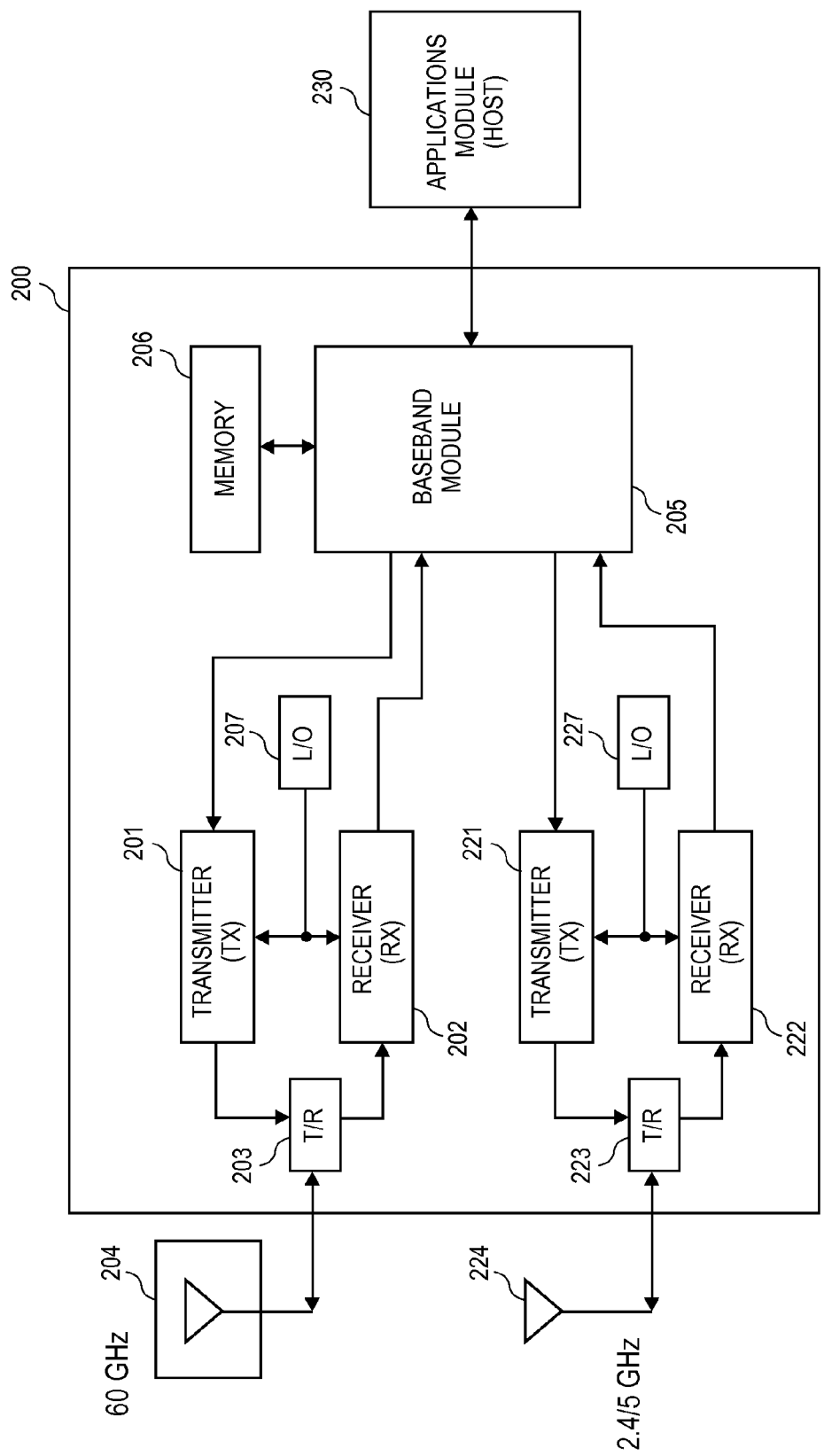
FIG. 3 is a hardware schematic block diagram showing a wireless communication device that may be incorporated in the content source and/or the content sink of FIGS. 1 and 2, according to one embodiment for practicing the invention.

FIG. 3 is a schematic block diagram illustrating part of a wireless communication device 200 that includes transmitters (TX) 201 and 221, receivers (RX) 202 and 222, local oscillators (LOs) 207 and 227, and baseband module 205. Baseband module 205 includes a processor to provide baseband processing operations. In some embodiments, baseband module 205 is or includes a digital-signal-processor (DSP). Baseband module 205 is typically coupled to a host unit, applications processor or other unit(s) that provides operational processing for the device and/or interface with a user.

In FIG. 3, an applications module 230 is shown. Applications module 230 may be an application processor in one instance or it may be a host unit in another instance. For example, in a notebook or laptop computer, applications module (or host) 230 may represent the computing portion of the computer, while device 200 is utilized to provide the radio components. Similarly, for a handheld device, applications module 230 may represent the application portion of the handheld device, while device 200 is utilized to provide the radio portion for communicating wirelessly between the handheld device and another device. Furthermore, device 200, as well as applications module 230, may be incorporated in one or more integrated circuits. In one embodiment, wireless communication device 200 and applications module 230 are integrated on separate integrated circuits. In one embodiment, both device 200 and applications module 230 are integrated on the same integrated circuit.

A memory 206 is shown coupled to baseband module 205, which memory 206 may be utilized to store data, as well as program instructions that operate on baseband module 205. Various types of memory devices may be utilized for memory 206. It is to be noted that memory 206 may be located anywhere within device 200 and, in one instance, it may also be part of baseband module 205.

Transmitter 201 and receiver 202 are coupled to an antenna assembly 204 via transmit/receive (T/R) switch module 203. In the particular example for device 200, transmitter 201 and receiver 202 are utilized to respectively provide transmit and receive functions for the 60 GHz communication. A T/R switch module 203 switches the antenna between the transmitter and receiver depending on the mode of operation. In other embodiments, separate antennas may be used for transmitter 201 and receiver 202. Furthermore, in other embodiments, multiple antennas or antenna arrays may be utilized with device 200 to provide antenna diversity or multiple input and/or multiple output, such as MIMO, capabilities.

As pertaining to a directional antenna for 60 GHz operation, antenna assembly 204 includes at least one directional antenna with circuitry for orienting the antenna in a particular direction for transmitting and/or receiving radio frequency signals. Antenna assembly 204 provides a directional antenna(s) or an antenna array with beamforming capabilities to direct the beam to concentrate the transmitted energy when transmitting and also to orient the antenna toward a transmitted beam when receiving. The 60 GHz Band, as specified by the Wireless gigabit Alliance (WGA or WiGig), specifies that 60 GHz Band devices utilize directional antennas in order to direct the transmitted spectrum energy. Device 200 in the present instance is capable is capable of transmitting and receiving in the millimeter wave range, including 60 GHz Band, utilizing antenna assembly 204.

Likewise, transmitter 221 and receiver 222 are coupled to an antenna 224 via transmit/receive (T/R) switch module 223 to provide transmit and receive operations at the 2.4/5 GHz range. Antenna 224 may a single antenna, multiple antennas or an antenna array. As noted above, separate antennas may be used for transmitter 221 and receiver 222. Furthermore, in other embodiments, multiple antennas or antenna arrays may be utilized for antenna 224 to provide antenna diversity or multiple input and/or multiple output, such as MIMO, capabilities. Likewise, although a T/R switch module is shown, other embodiments may use other devices (such as duplexers) or may not use such switching circuitry at all.

Outbound data for transmission from applications module 230 are coupled to baseband module 205 and converted to baseband signals and then coupled to transmitter 201 or 221, depending on the band to be transmitted. Transmitter 201 or 221 converts the baseband signals to outbound radio frequency (RF) signals for transmission from the respective antenna. Transmitter 201 or 221 may utilize one of a variety of up-conversion or modulation techniques to convert the outbound baseband signals to outbound RF signal based on the protocol selected.

In a similar manner, inbound RF signals are received by the respective antenna and coupled to receiver 202 or 222, depending on the frequency. Receiver 202 or 222 then converts the inbound RF signals to inbound baseband signals, which are then coupled to baseband module 205. Receiver 202 or 222 may utilize one of a variety of down-conversion or demodulation techniques to convert the inbound RF signals to inbound baseband signals based on the protocol selected.

Baseband module 205 operates utilizing at least two communication protocols and provides necessary packetization (or operates in conjunction with other components that provide packetization) and other data processing operations on received signals and signals that are to be transmitted. As an alternative embodiment, the baseband module 205 may be comprised of two separate baseband processors, one to process baseband signals for 60 GHz and the other to process baseband signals for 2.4/5 GHz.

LO 207 provides local oscillation signals for use by transmitter 201 for up-conversion and by receiver 202 for down-conversion. LO 227 provides local oscillation signals for use by transmitter 221 for up-conversion and by receiver 222 for down-conversion. In one embodiment, separate LOs may be used for the transmitter and the receiver. Similarly, in one embodiment one L/O may provide local oscillations for both transmitters and/or both receivers. Although a variety of LO circuitry may be used, in some embodiments, a PLL is utilized to lock the LO to output a frequency stable LO signal based on a selected channel frequency.

It is to be noted that in one embodiment, baseband module 205, LOs 207, 227, transmitters 201, 221 and receivers 202, 222 are integrated on the same integrated circuit (IC) chip. Transmitters and receivers are typically referred to as the RF front-end. In other embodiments, one or more of these components may be on separate IC chips. Similarly, other components shown in FIG. 3 may be incorporated on the same IC chip, along with baseband module 205, LOs, transmitters and receivers. In some embodiments, the antennas may also be incorporated on the same IC chip as well. Furthermore, with the advent of system-on-chip (SOC) integration, host devices, application processors and/or user interfaces, such as applications module 230, may be integrated on the same IC chip along with baseband module, transmitters and receivers. Accordingly, in one embodiment, the structure and circuitry illustrated in FIG. 3 may be utilized as part of AV content source 101 and/or AV content sink 102. The processing of AV protocol adaption layer in one embodiment may be provided by processors in baseband module 205 (FIG. 3), applications module 230, or by both modules 205 and 230.

As noted in the Background section above, the higher frequency transmissions, such as at 60 GHz, provide higher data rate transfer, so that large size displays and/or displays rendering higher resolution (e.g. 1080p HD and higher) have improved performance. However, also as noted above, the directional and short range transmission at 60 GHz may cause interruptions in the content transmission to the display when the communication link between the source and the display is interrupted or lost. Likewise, in embodiments where the communication linkage may be comprised of multiple segments, an interruption or loss of the linkage in any segment, wired or wireless, could cause the break in the communication between the source and the sink (e.g. display). A prolonged interruption may result in less than desirable QoS for the content being rendered or less than seamless presentation of the content being rendered. In order to compensate for the situation when the higher frequency link is interrupted or lost, one embodiment of the invention provides an alternate route through the use of the lower frequency link. That is, in one embodiment of the invention, an alternate route using the 2.4/5 GHz communication link is used to transfer the AV content, whenever the 60 GHz communication link is lost or interrupted for a designated time. Again, as noted above, the interruption or loss may be due to a wireless and/or wired connection.

In order to supplement the link, whenever the 60 GHz link is interrupted, AV content source 101, shown in FIGS. 1 and 2, reroutes the signal via the WiFi network utilizing a 2.4/5 GHz communication protocol. In order to reduce content interruption (which may be in the form of video latency or display jitter), a Fast Session Transfer (FST) process is used to transfer the content from one network to the other. The FST between the 60 GHz link and the 2.4/5 GHz link, when done properly, allows very little added latency and/or jitter to be noticeable on the display. Preferably, when the transition is performed seamlessly, a user may not notice any appreciable difference in the streamed AV presentation on the display.

Several problems may need to be overcome when transitioning the content between the two links. First, data transfer over 2.4/5 GHz utilizes Internet Protocol (IP), but data transfer over 60 GHz is not all over IP. Thus, some protocol conversion may be needed. Also, 2.4/5 GHz WiFi utilizes contention based arbitration to contend for network channel access, whereas in the 60 GHz Band, Service Period (SP) scheduling is used to schedule a communication time period between devices. Since contention based transmission has a tendency to increase jitter while the device is contending for access (e.g. appreciable time is used to contend for access along with other device), it is not desirable to use contention based transmissions in its legacy format for sending data over IP when transmitting higher rate video content over 2.4/5 GHz. Additionally, in order to provide for inexpensive and less complex encoders and/or decoders (encoder/decoder) for high quality video encoding/decoding, a device may utilize an encoder/decoder buffer having limited available memory storage for WDE functionality. In one embodiment for WDE display data transfer, the encoder/decoder buffer is selected to have only 1 Mbps capability. Thus, low memory requirements may be a constraint in providing high bit rate throughput at 60 GHz, which also may be a constraint when the 60 GHz intended content is transferred for 2.4/5 GHz transmission, if the same buffer structure is to be used.

Figure 4:
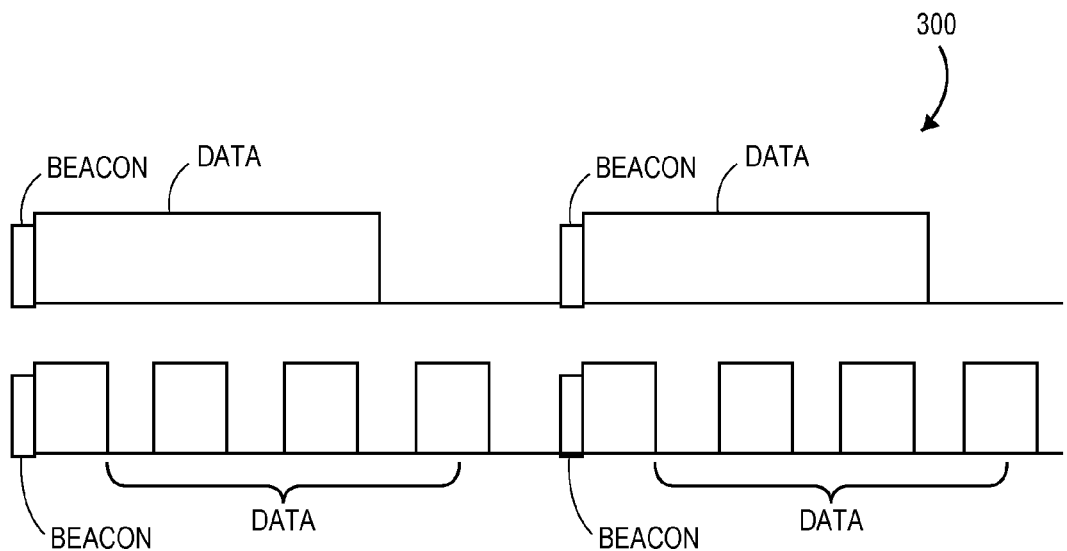
FIG. 4 shows AV protocol adaption layer content for transmission at frequencies at and above 2.4/5 GHz, where data is parceled into separate smaller packet groupings to accommodate for smaller decoder buffer available at the content sink, according to one embodiment of the invention.

FIG. 4 illustrates a diagram 300 for the handling of AV content for 60 GHz transmissions when using service period (SP) scheduling. Generally with most data transfers occurring via 60 GHz transmissions, such as transmissions utilizing 802.11ad, a service period may be scheduled between the sender and the recipient and the data streamed following a beacon (upper portion of diagram 300 of FIG. 4). When low memory buffers are utilized, as in the instance with WDE requirements, the data is separated into multiple chunks, to provide gaps in the transmission (lower portion of diagram 300 of FIG. 4) in order to prevent the small buffer from overflowing. This breaking up of content allows the receiving buffer in the display to accommodate the data stream. With the usage of low memory buffer in WDE operations, a tighter synchronization between the AV content source and the display is desirable to reduce latency and jitter. One way to achieve the synchronization of the data chunks is through tighter specification requirements on Pixel Clock Reference (PCR) and Variable Delay References (VDRs) sent with the content, where precision and frequency of occurrence are addressed for WDE operations. Accordingly, when the content transmission is re-routed for transmission over IP via the 2.4/5 GHz link, this content fragmentation needs to be considered as well.

When 60 GHz intended content is re-routed from a 60 GHz communication link to a 2.4/5 GHz communication link, the tighter synchronization between the AV content source and the display may be maintained, albeit transmitting the content all over Internet Protocol (IP) now. A stricter requirement is still to be maintained for PCR precision and occurrence, and the transmission scheduling content delay (due to content data fragmentation) may be conveyed to the display. Although a variety of techniques may be implemented to convey the information to the display regarding the AV content, in one embodiment the 802.11v specification of the IEEE 802.11 protocol is utilized. IEEE 802.11v is a non-required additional specification to IEEE 802.11 protocol for use in exchanging network information and/or configuring of devices communicating using IEEE 802.11a/b/g/n protocols. The 802.11v specification is an optional WiFi enhancement interface that allows WiFi devices to be mapped down to the client level. Information regarding what kind of client device and location may be exchanged so that devices may be configured in the exchange. The 802.11v may also permit one device to determine a transmission delay in sending data to a client device.

Thus, in one embodiment, the 802.11v specification is used to convey various management information between the AV source and the AV sink. Accordingly, functions such as PCR specification requirements, content airtime transfer and delay may be communicated between the AV source and sink, so that the receiving device is made aware of the nature of the data being transported over IP. In other embodiments, other mechanisms, other than 802.11v, may be utilized.

Furthermore, as noted, 60 GHz communications may utilize SP scheduling, instead of contention based access in obtaining airtime over the link. SP scheduling is generally not available for most 2.4/5 GHz communications. However, the contention based transmission to acquire channel access, as used in current 2.4/5 GHz communications, is not highly suitable for transmitting high data rate content over IP at 2.4/5 GHz. This is due to the delays encountered in obtaining link access, which delay may result in additional latency. Therefore, some mechanism, other than the currently practiced contention-based access of the link, is to be implemented to ensure that the delay between the fragmented content packets is kept minimal, yet sufficient to not overload the small memory buffer of the display.

In one embodiment, an AV protocol adaptation layer (AVPAL) is used to process the AV content and to format the content based on the protocol selected. The AVPAL also signals the Media Access Control (MAC) layer of the AV content source to instruct that the content being sent is the high data rate AV content. This signaling to the MAC layer informs the MAC layer to ensure proper transmission of the data content from the Physical (PHY) layer to prevent significant delay between the whole AV content being sent. Although various signaling techniques may be used to instruct the MAC layer, in one embodiment, the signaling is achieved through a header.

Figure 5:
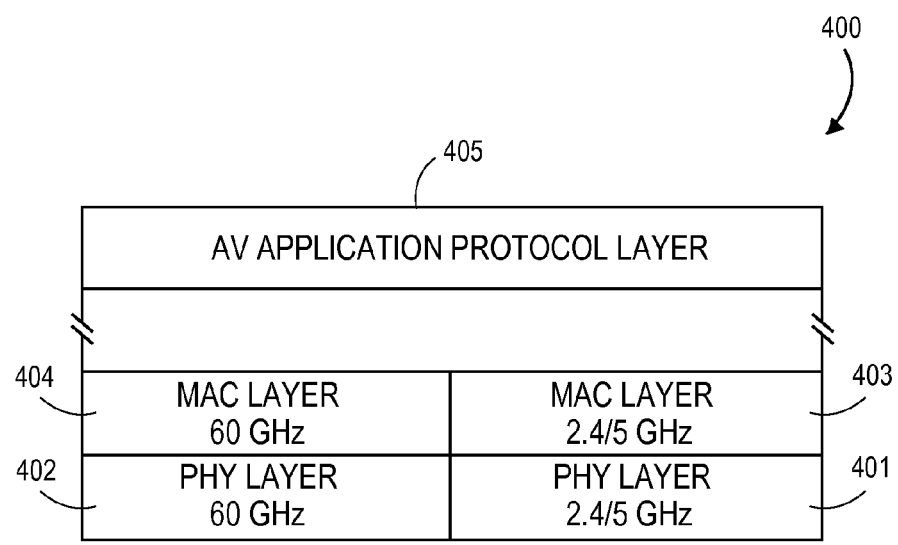
FIG. 5 shows a layout of several operational layers as practiced in accordance with an embodiment of the invention.

FIG. 5 shows a diagram of a layer structure 400, in which an AVPAL 405 lies above the MAC and PHY layers. The underlying MAC layer is separated in to a 2.4/5 GHz MAC layer 403 and 60 GHz MAC layer 404. Likewise the underlying PHY layer is separated into a 2.4/5 GHz PHY layer 401 and 60 GHz PHY layer 402. The overlying AVPAL layer 405 ensures that the AV content requirements that are transmitted over 60 GHz are also conveyed to the MAC and PHY layers for 2.4/5 GHz transmission. Accordingly, with proper instruction from AVPAL layer 405, the MAC layer ensures that the content being streamed to the display follows the fragmented transmission to address low memory decoder buffer requirements in the display, but at the same time ensure that no other significant delay is introduced so that tighter specification requirements of 60 GHz transmissions are somewhat maintained. It is to be noted that transmissions of AV content over IP may not fully approach the throughput available for transmissions over 60 GHz. However, with the practice of the invention, the sending AV contents over IP may provide improved throughput over normal WiFi without overflowing the buffer, which then allows for less interrupted streaming of AV content. Likewise, jitter and other undesirable artifacts may be reduced with the utilization of the present invention.

Figure 6:
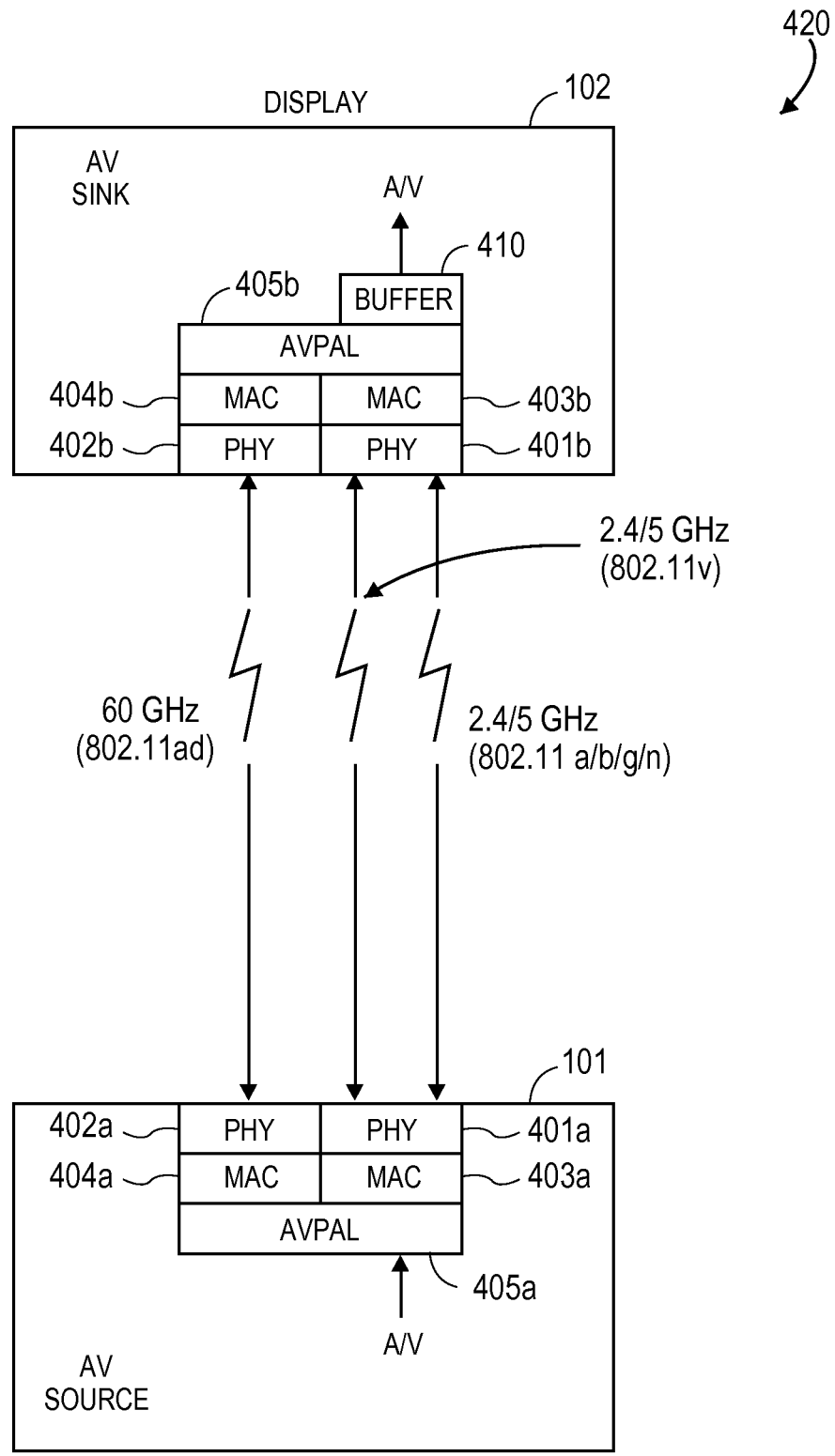
FIG. 6 shows an embodiment of the invention in which Fast Session Transfer is provided by the content source, when changing the communication link from a higher frequency to a lower frequency, according to one embodiment of the invention.

In FIG. 6, a system 420 shows one application of the above-described embodiments of the invention. As noted, the 60 GHz link is shown utilizing 802.11ad standard/protocol between AV source 101 and AV sink 102. Again, AV sink is typically a display for AV content. The 60 GHz link is the primary link for transferring the AV content from AV source 101 to AV sink 102. The 2.4/5 GHz secondary or alternate link is shown utilizing one or more of 802.11a/b/g/n protocol (or standard), where the AV content is sent over IP. The 802.11v link is shown as a separate link, but it is understood that 802.11v is an added component to 802.11a/b/g/n. In one embodiment for practicing the invention, 802.11v is mandated for use with 802.11a/b/g/n whenever high data rate AV content is being transmitted over IP. The AVPAL-MAC-PHY layers of FIG. 5 are shown duplicated (401a-405a) within AV source 101, so that high data rate instruction is communicated by the AVPAL layer to the MAC layer. The AV content information is sent via 802.11v, so that proper link access is obtained with AV sink 102 to transmit the AV content over IP without introducing significant additional latency and/or jitter. It is to be noted that direct communication links are shown in FIG. 6, but as noted in reference to FIGS. 1 and 2, one or both of the communication link(s) may utilize indirect paths and one or both of the communication link(s) may incorporate wireless and/or wired connections.

The AVPAL-MAC-PHY layers of FIG. 5 are shown duplicated (401b-405b) within AV sink 102, as well. The earlier described buffer is shown in AV sink 102 as buffer 410. As noted, the buffer in one WDE application has limited storage space and in one embodiment, buffer 410 is a 1 Mbps buffer. Thus, by utilizing an AV protocol adaptation layer (AVPAL) as described above, the AVPAL obtains tighter specifications between the AV content source and the content sink (e.g. display) and reduces contention-based air time delay. This allows higher data rate content destined for higher frequency communications to be transferred to lower frequencies, where the content is re-packetized for transmission over Internet Protocol (IP). However, the latency and jitter, that may be encountered at the lower frequency transmission, may be reduced by practicing the embodiments of the invention described above.

Figure 7:
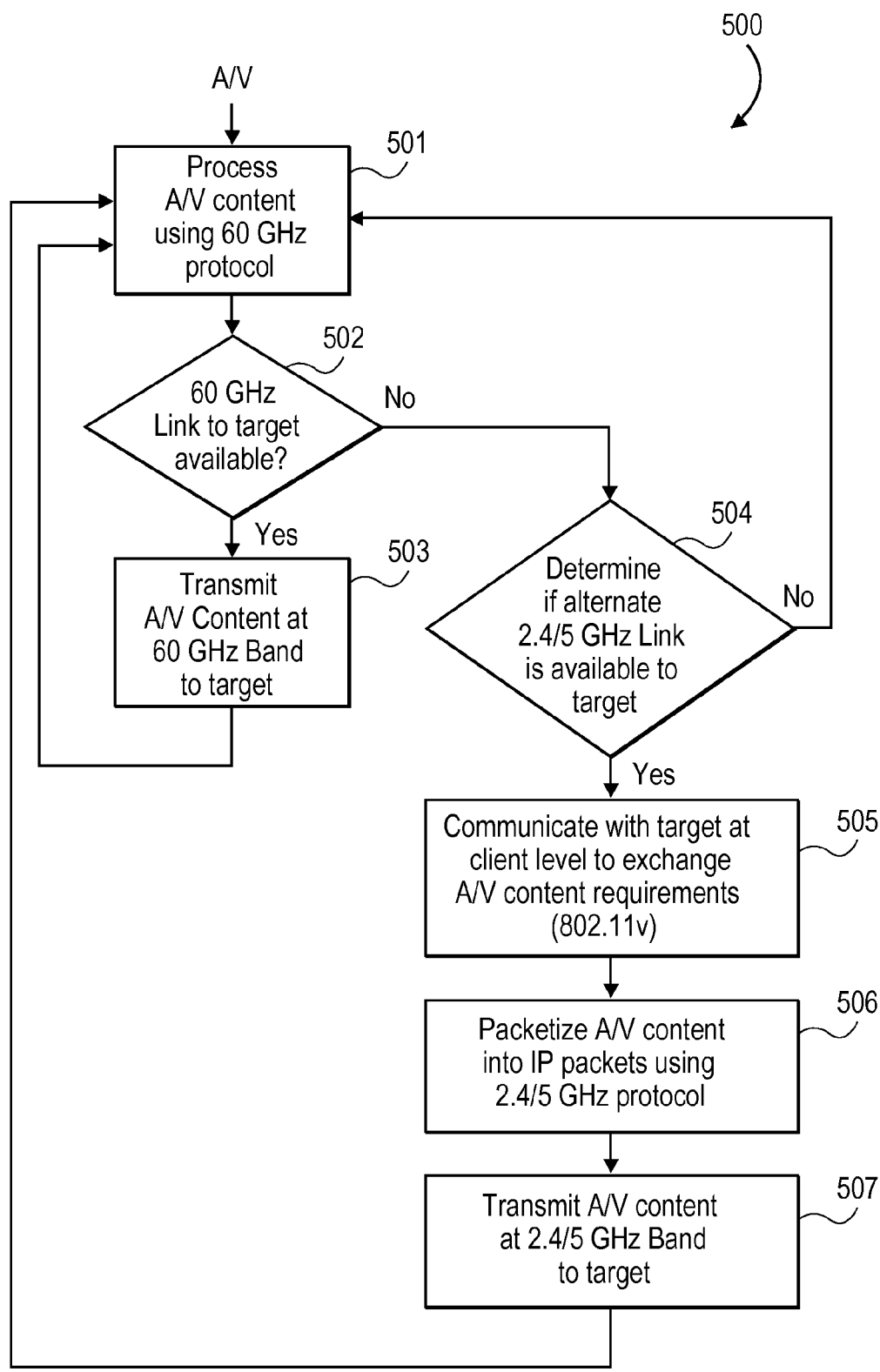
FIG. 7 shows a flow chart in providing the Fast Session Transfer of FIG. 6, according to one embodiment of the invention.

FIG. 7 shows a flow diagram 500 for switching the AV content transmission from 60 GHz to IP over 2.4/5 GHz. When receiving AV content, AVPAL of the AV source device processes the content for transmission over the 60 GHz Band (e.g. 802.11ad) (block 501). When the 60 GHz link is available to the target device (e.g. AV sink, display) (block 502), the AV content is transmitted over the 60 GHz link (block 503). When the 60 GHz link is not available, or the link is lost (or interrupted) during transmission of the AV content, the AV source determines if an alternate 2.4/5 GHz link is available to the target device (block 504). When the 2.4/5 GHz link is available to the target device, the AV source communicates with the target device to exchange client level information to prepare the target device for receiving the AV content. Content specific requirements may be exchanged as well, so that the target device is ready to receive the high data rate AV content (block 505). The AV content is packetized for IP using 2.4/5 GHz protocol (block 506) and transmitted using the 2.4/5 GHz Band (e.g. 802.11 a/b/g/n) (block 507). Whenever the 60 GHz link is re-established, the content transfer may be switched back to the 60 GHz link.

Thus, higher data rate content, normally transmitted over higher frequencies, such as millimeter wave frequencies, may be sent over Internet Protocol at lower frequencies with manageable jitter and latency. Buffer overflow control may be utilized as well. Although the embodiments of the invention are described with specific examples pertaining to an IEEE 802.11 specifications, the invention is not limited to such usage. Likewise, the embodiments of the invention are discussed as pertaining to the 60 GHz Band and the 2.4/5 GHz Band, but the invention may be readily adapted to other frequencies and bands as well. The embodiments of the invention are applicable to switching the transmission of data from a first frequency communication link to a second frequency communication link, when the first frequency communication is no longer available. As described in the disclosure, the first frequency communication link operates at a higher frequency than the second frequency communication link. However, in other embodiments, the situation may be the opposite with the operating frequencies. By maintaining tighter specifications for data transfer, higher throughput of data may be obtained than that normally available for the communication link at the lower frequency. Although the examples described herein pertain to wireless communication linkage, other embodiments of the invention may be applicable to situations when both links are wireless, both links are wired, one link is wireless and the second is wired, or one or both links have combination of wireless and wired connections.

Furthermore, although the described application of the invention is switching from the 60 GHz Band to the 2.4 GHz and/or 5 GHz Band, the technique may be implemented in legacy devices that operate using only the 2.4/5 GHz standard/protocol. Thus, in an alternative embodiment, when the content source with both modes identifies a target display as a legacy display that does not support 60 GHz, the high data rate over IP technique at 2.4/5 GHz, as described above when switching from the higher frequency to the lower frequency, may be used to ensure transfer of high data rate content over IP without introducing appreciable additional latency and/or jitter.

Thus, a technique to provide AV data transmission over Internet Protocol at higher rates is described. The technique is applicable to all forms of data and not just to AV data. The technique may be utilized with communication links that are wireless, wired or links having a combination of both wireless and wired connections.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information.

I claim:

1. A method comprising:

formatting data content by control of an audio/video protocol adaptation layer based upon characteristics of a first communication protocol, the formatted data content destined for transmission to a target device over a first frequency band using the first communication protocol and during a beacon interval, wherein the formatted data content is separated into a plurality of data chunks to provide gaps in the transmission to avoid overflow of a decoder buffer in the target device, the formatted data content including timing reference information to maintain synchronization of the data chunks, and wherein the first communication protocol is a non-Internet Protocol based communication protocol;

reformatting a portion of the data content including a subset of the plurality of the data chunks, by control of the audio/video protocol adaptation layer and upon unavailability or interruption of transmission over the first frequency band using the first communication protocol, for transmission over a second frequency band using a second communication protocol, wherein the first frequency band is higher in frequency than the second frequency band;

communicating with the target device to establish transmission specifications to manage transfer of the reformatted portion of the data content over the second frequency band and to maintain synchronization of the plurality of data chunks to avoid overflow of the decoder buffer in the target device, in accordance with the timing reference information, when the subset of the plurality of data chunks are transmitted over the second frequency band; and transmitting the portion of the data content over the second frequency band using the second communication protocol and the transmission specifications.

2. The method of claim 1, wherein reformatting the portion of the data content includes packetizing the portion of the data content for Internet Protocol compliant transmission over the second frequency band.

3. The method of claim 2, wherein the first communication protocol is based on an IEEE 802.11ad protocol specification.

4. The method of claim 2, wherein the first communication protocol is based on a millimeter wave protocol specification.

5. The method of claim 2, wherein the second communication protocol is based on one of IEEE 802.11a, IEEE 802.11b, IEEE 802.11g or IEEE 802.11n protocol specifications.

6. The method of claim 2, wherein communicating with the target device to establish the transmission specifications, the communicating is based on an IEEE 802.11v specification.

7. The method of claim 1, wherein the first frequency band is a 60 GHz band and the second frequency band is either a 2.4 GHz band or a 5 GHz band.

8. A method comprising:
formatting data content into a first format based on a first communication protocol at a source device to transmit the data content during a beacon interval over a first frequency band using a directional transmission, wherein the data content is separated into a plurality of data chunks to provide transmission gaps to not overflow a buffer in a target device, and wherein the first communication protocol is a non-Internet Protocol based communication protocol;

establishing first communication protocol parameters to service the data content so as to not overflow the buffer in the target device, the first communication protocol parameters including timing reference information relating to synchronization of the plurality of data chunks;

transmitting a portion of the data content over a first communication link at the first frequency band to the target device;

detecting that the first communication link to the target device is not present;

formatting the data content based on a second communication protocol to transmit the data content over a second frequency band using a non-directional transmission, wherein the first frequency band is higher in frequency than the second frequency band;

communicating with the target device to establish transmission specifications to manage transfer of the data content over the second frequency band and to maintain synchronization, between the source device and the target device, of the plurality of data chunks when transmitted over the second frequency band so as to not overflow the buffer in the target device; and transmitting the data content over a second communication link at the second frequency band using the second communication protocol.

9. The method of claim 8, wherein when communicating with the target device to establish transmission specifications, the communicating is performed over the second communication link using the second communication protocol.

10. The method of claim 8, wherein the formatting of the data content based on the first communication protocol and the second communication protocol is performed in a protocol adaptation layer.

11. The method of claim 10, wherein when formatting the data content based on the second communication protocol the data content is formatted for Internet Protocol compliant transmission over the second frequency band.

12. The method of claim 11, wherein the first communication protocol is based on an IEEE 802.11ad protocol specification.

13. The method of claim 11, wherein the second communication protocol is based on one of IEEE 802.11a, IEEE 802.11b, IEEE 802.11g or IEEE 802.11n protocol specifications.

14. The method of claim 13, wherein when communicating with the target device to establish transmission specifications, the communicating is based on an IEEE 802.11v specification.

15. The method of claim 13, wherein the first frequency band is a 60 GHz band and the second frequency band is either a 2.4 GHz band or a 5 GHz band.

16. An apparatus comprising:
a transmitter to transmit outbound radio frequency (RF) signals;
a receiver to receive inbound RF signals; and
a processing module, including a processor and coupled to the transmitter and the receiver, to provide processing of data content specified by a communication protocol to:
format the data content, based upon characteristics of a first communication protocol, the formatted data content destined for transmission to a target device over a first frequency band using the first communication protocol and during a beacon interval, wherein the formatted data content is separated into a plurality of data chunks to provide gaps in the transmission to avoid overflow of a decoder buffer in the target device, the formatted data content including timing reference information to maintain synchronization of the data chunks, and wherein the first communication protocol is a non-Internet Protocol based communication protocol;

upon unavailability of transmission over the first frequency band using the first communication protocol, reformat the data content including a subset of the plurality of the data chunks for transmission over a second frequency band using a second communication protocol, wherein the first frequency band is higher in frequency than the second frequency band;

communicate with the target device using a third communication protocol to establish transmission specifications to manage transfer of the reformatted data content over the second frequency band and to maintain synchronization of the plurality of data chunks to avoid overflow of the decoder buffer in the target device, in accordance with the timing reference information, when transmitted over the second frequency band; and transmit the data content over the second frequency band using the second communication protocol.

17. The apparatus of claim 16, wherein when the processing module reformats the data content, the data content is formatted for Internet Protocol compliant transmission over the second frequency band.

18. The apparatus of claim 17, wherein the first communication protocol is based on an IEEE 802.1 lad protocol specification.

19. The apparatus of claim 17, wherein the second communication protocol is based on one of IEEE 802.11a, IEEE 802.11b, IEEE 802.11g or IEEE 802.11n protocol specifications.

20. The apparatus of claim 17, wherein the third communication protocol is based on an IEEE 802.11v specification.

* * * * *